2,710,582

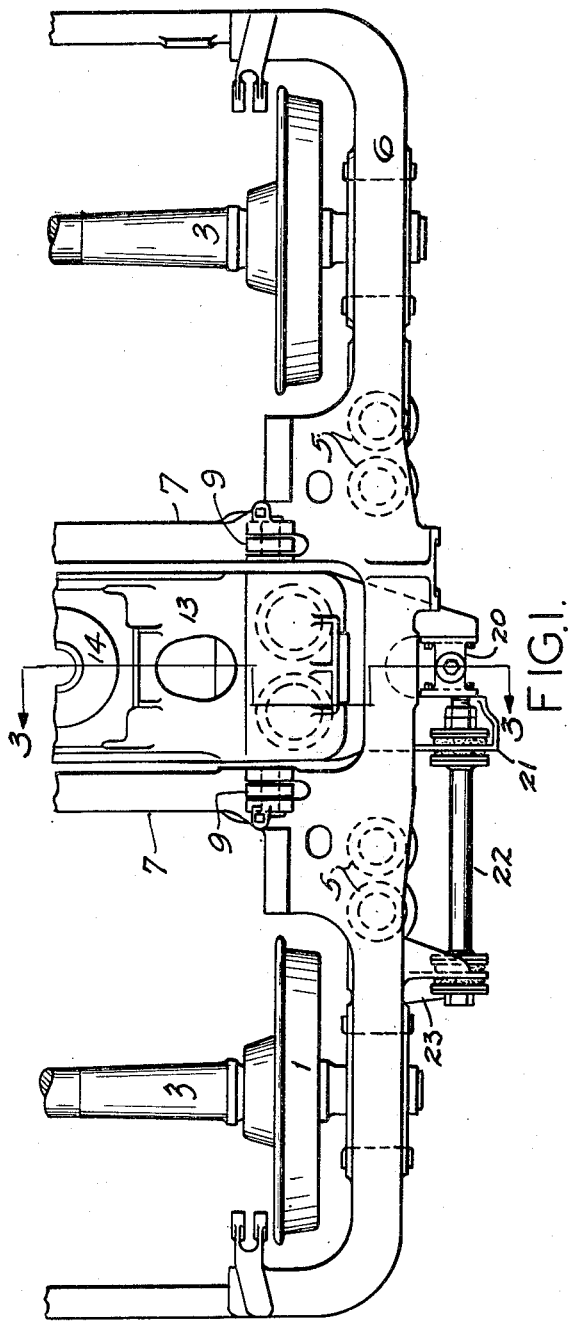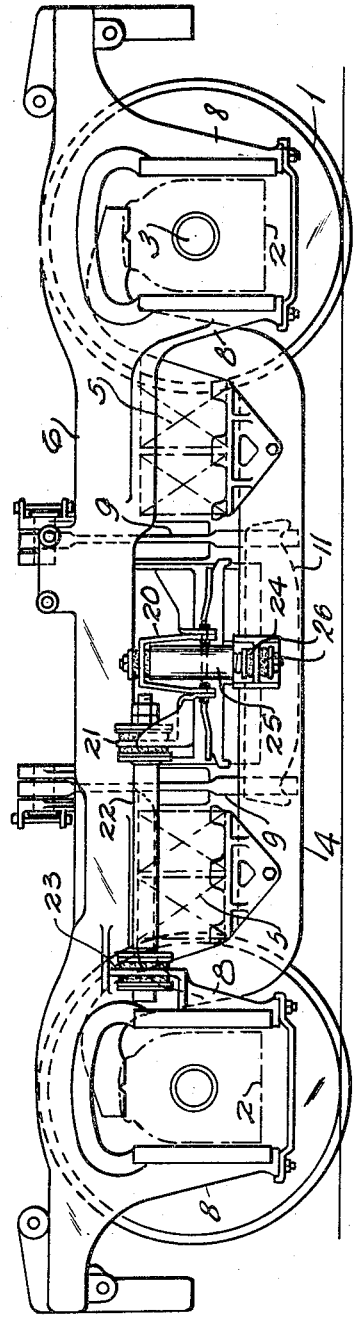

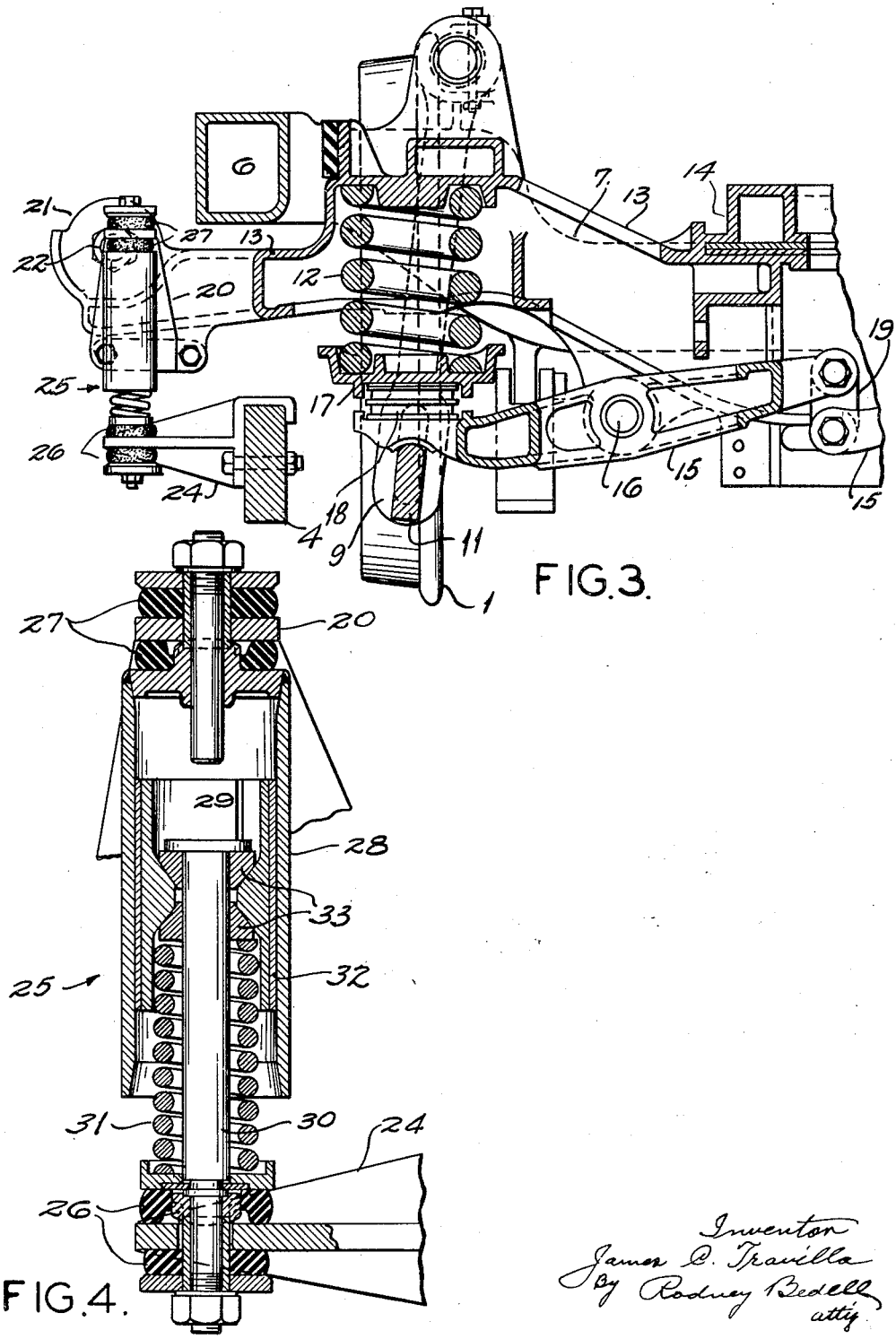

RAILWAY TRUCK STRUCTURE

James C. Travilla, University City, Mo., assignor to General Steel Castings Corporation, Granite City, Ill., a corporation of Delaware Application February 7, 1951, Serial No. 209,823

6 Claims. (Cl. 105—190)

The invention relates to railway rolling stock and more particularly to an improved truck construction. The invention consists in a combination of load-carrying truck parts with interposed springs arranged in series with a single snubber controlling all of the springs.

The main object of the invention is to obtain easier riding characteristics, particularly desirable in passenger train equipment.

Passenger train trucks usually include spaced wheel and axle assemblies with equalizers extending longitudinally of the truck and supported upon these assemblies. Springs are mounted upon each equalizer and are spaced longitudinally of the truck and carry the truck frame. A load-carrying bolster is carried by additional springs supported from the truck frame.

It has been proposed heretofore to provide separate snubbers for the bolster springs but having no effect on the equalizer springs. Merely adding snubbers for the equalizer springs would involve undesirable weight and expense, and difficulties in application, and some arrangements of separate snubbers for both sets of springs likely would interfere with the primary function of the equalizers in accommodating rail irregularities.

It is an additional object of the present invention to effect snubbing of all the bolster and equalizer springs at one side of the truck by a single snubber or like device functioning when the springs move together in the same vertical direction, but avoiding interference with the intended action of the equalizer which may involve the compression of the spring near one end of the equalizer and the simultaneous expansion of the spring near the other end of the equalizer.

These and other detail objects are attained by the structure shown in the accompanying drawings illustrating a selected embodiment of the invention, in which:

Figure 1 is a top view of one longitudinal half of a four wheel truck.

Figure 2 is a side elevation of the same.

Figure 3 is a vertical transverse section taken on the line 3—3 of Figure 1 and drawn to an enlarged scale.

Figure 4 is a detail view of the snubber unit shown in Figures 1-3 and is drawn to a still larger scale.

The truck includes spaced assemblies of wheels 1, journal boxes 2 and axles 3. A drop equalizer 4 extends between and rests upon the journal boxes at each side of the truck and mounts equalizer springs 5 which may be arranged in spaced units of two or more springs each. Each unit is positioned between one wheel and axle assembly and the middle of the truck and preferably nearer to the corresponding wheel and axle assembly than to the other spring unit.

A rigid truck frame is mounted upon springs 5 and includes wheel pieces 6, transverse transoms 7, and depending pedestal legs 8 which receive between them journal boxes 2. Pivotally suspended from the truck frame are swing hangers 9 arranged in pairs at opposite sides of the truck, there being a cross bar 11 extending between the lower ends of each pair of hangers. Supported from the hangers by cross bar 11 are coil springs 12, mounting the bolster 13 which extends from side to side of the truck and includes a load-carrying center plate 14 for mounting the body center plate, not shown. The action of bolster springs 12 at opposite ends of the bolster may be equalized by arrangement of levers 15, each pivoted to the bolster at 16 with its outer end resting upon cross bar 11 and supporting the bolster spring seat 17 through rubber pads 18. The inner ends of levers 15 are connected by a link 19. This stabilization structure is disclosed in Patent No. 2,284,695, issued April 22, 1947.

The bolster extends transversely of the truck over equalizers 4, beneath wheel pieces 6 and outwardly of the truck beyond the equalizers and wheel pieces and at each end is forked horizontally and provided with an inverted U-shaped bracket 20, the legs of which have their ends secured to the forked elements of the bolster. Another bracket 21 is shown as integral with the bolster and serves to attach one end of an anchor device 22, the other end of which is secured to a bracket 23 on the truck frame. Brackets 20 and 21 are in substantial alignment longitudinally of the truck.

A bracket 24 is bolted to each equalizer 4 intermediate the ends of the latter and projects outwardly from the equalizer beneath bracket 20.

A snubber 25 of the telescoping type has its relatively movable opposite ends secured substantially directly to the upper end of bolster bracket 22 and to the outer end of equalizer bracket 24, respectively. The snubber shown includes a cylinder 28 receiving friction shoes 29, and a rod 30 projecting from the lower end of the cylinder. A spring 31 and wedges 33 expand the shoes 29. A friction element 32 on the shoes 29 resists the relative movement of the shoes 29 and cylinder 28. The connections between the snubber and the associated brackets include rubber pads 26, 27, respectively, which permit the snubber to pivot on the brackets and thereby accommodate inclination of the snubber relative to the equalizer and bolster.

The group of coil springs 5 at one end of the equalizer may compress while the group of springs 5 at the other end of the equalizer may expand or remain substantially stationary without being affected by the snubber, but if the associated bolster spring expands or compresses or if both sets of equalizer springs expand or compress simultaneously, the snubber will function to prevent synchronization of successive impulses and to snub rebound spring action.

With this arrangement, a single snubber at each side of the truck controls both the equalizer and the bolster springs at that side of the truck without interfering with the tilting of the equalizer in a vertical plane extending longitudinally of the truck or with the lateral motion of the bolster due to the action of the swing hangers, thus providing a simple, effective control for the spring action.

In addition, the connections may yield slightly under forces tending to move the bolster and equalizers vertically relative to each other but of such slight amplitude that they do not overcome the friction between shoes 29 and cylinder 28. However, such yielding of the rubber connections cannot be synchronized or built up to a degree which might result in undesired actions of one spring system, as might be the case if the snubber did not extend across both spring systems. This is an additional advantage over the use of a single snubber associated with one spring system only, as has been used previously, but with which yielding rubber connections to the interconnected parts has been avoided because of the undesirable build up of slight rubber-distorting movements into a larger movement affecting the unsnubbed spring. It was necessary for the snubber to function promptly with even the smallest relative vertical movement of the interconnected parts to avoid undesirable build up. With the present structure, the distortion, by slight shocks, of cushions 26, 27 only is permissible because the snubber is connected across both spring systems and will effectively snub a movement, such as might otherwise be built up by the cushions, of sufficient amplitude to move the snubber parts 28, 29 relative to each other.

It will be understood that different types of snubbers may be substituted for the telescoping snubber shown and that the bolster swing hangers may be positioned outwardly of the truck wheel pieces and the truck details may be varied otherwise without departing from the spirit of the invention and the exclusive use of those modifications coming within the scope of the claims is contemplated.

What is claimed is:

1. In a railway truck, spaced wheel and axle assemblies, equalizers extending between said assemblies, a frame, spring-supported on said equalizers and including wheel pieces above said equalizers, a load-supporting bolster, spring-supported from said frame and including a horizontally forked end, an inverted U-shaped bracket at each end of the bolster with the lower ends of its legs secured to the forked portions of the bolster and with its cross bar positioned above the level of the top of the adjacent bolster end, a bracket on the corresponding equalizer extending outwardly beyond the vertical plane of the outer face of the wheel piece and beneath the bolster bracket, and an upright snubber including telescoping members with the outer ends of said members secured by universal joint connections to the equalizer bracket and to the cross bar of the bolster bracket.

2. In a railway truck, spaced wheel and axle assemblies, equalizers extending between said assemblies, a frame, spring-supported on said equalizers and including wheel pieces above said equalizers, a load-supporting bolster, spring-supported from said frame and including a horizontally forked end, an inverted U-shaped bracket at each end of the bolster with the lower ends of its legs secured to the forked portions of the bolster and with its cross bar positioned above the level of the top of the adjacent bolster end, a bracket on the corresponding equalizer extending laterally therefrom beneath the bolster bracket, and a snubber including relatively movable members secured respectively to the equalizer bracket and to the cross bar of the bolster bracket.

3. In a railway truck, spaced wheel and axle assemblies, an equalizer at each side of the truck extending between said assemblies, spring units on each of said equalizers, spaced apart longitudinally of the truck, a rigid truck frame including wheel pieces mounted on said spring units, a pair of swing hangers spaced longitudinally of the truck and suspended from said frame inboard of each wheel piece and near the middle of the latter, upright coil spring structure positioned between and carried by each pair of said hangers, a load-carrying bolster mounted on said spring structure and having end portions extending outwardly of the truck beneath said wheel pieces and beyond the same, brackets on said equalizers extending therefrom outwardly of the truck and beyond the wheel pieces, and a snubbing device at each side of the truck positioned outwardly of the corresponding wheel piece and equalizer and having relatively movable parts connected respectively to the associated bolster end portion and equalizer bracket.

4. A railway truck as specified in claim 3 which includes an anchor device extending longitudinally of the truck outboard of the wheel piece and connected at one end to the truck frame adjacent one of the wheel and axle assemblies and connected at its other end to the bolster at one side of and spaced from the connection between the snubber and the bolster.

5. In a railway truck, spaced apart wheel and axle assemblies, equalizers extending between said assemblies, coil spring units on each equalizer spaced apart longitudinally of the truck with one unit nearer to the corresponding assembly than to the other unit, a truck frame mounted on said spring units, coil spring structure supported from each side of the truck frame intermediate said first mentioned spring units and disposed symmetrically about the transverse center line of the truck, a bolster supported on said spring structure, and a single snubber connected to the bolster and to the equalizer substantially on the transverse center line of the truck, whereby snubbing resistance to tilting action of the equalizer relative to the truck frame in a longitudinal vertical plane is minimized.

6. In a railway truck, spaced wheel and axle assemblies, equalizers extending between said assemblies, coil spring units on each of said equalizers and spaced apart longitudinally of the truck, a rigid truck frame mounted on said spring units, a pair of coil springs supported from the frame at each side of the truck and spaced apart longitudinally of the truck, a truck bolster supported on said pairs of springs, and a single snubber on each side of the truck positioned on the transverse center line and connected at its lower end to the associated equalizer and at its upper end to the adjacent end of the truck bolster.

References Cited in the file of this patent

UNITED STATES PATENTS

| Number | Name | Date |
|---|---|---|
| 2,309,265 | Traville | Jan. 26, 1943 |
| 2,319,623 | Nystrom | May 18, 1943 |
| 2,347,500 | Parke | Apr. 25, 1944 |
| 2,355,104 | Pflager | Aug. 8, 1944 |
| 2,379,005 | Jackson et al. | June 26, 1945 |
| 2,497,829 | Baselt | Feb. 14, 1950 |
| 2,516,081 | Spencer | July 18, 1950 |

FOREIGN PATENTS

| 329,261 | Italy | Sept. 4, 1935 |